United States Patent
Aubry

(10) Patent No.: US 8,791,801 B2
(45) Date of Patent: Jul. 29, 2014

(54) PROXIMITY DETECTION DEVICE FOR A MOTOR VEHICLE

(75) Inventor: Jean-Marcel Aubry, Bourogne (FR)

(73) Assignee: Faurecia Bloc Avant, Nanterre (FR)

( * ) Notice: Subject to any disclaimer, the term of this patent is extended or adjusted under 35 U.S.C. 154(b) by 174 days.

(21) Appl. No.: 12/996,476

(22) PCT Filed: Jun. 5, 2009

(86) PCT No.: PCT/FR2009/051063
§ 371 (c)(1),
(2), (4) Date: Feb. 8, 2011

(87) PCT Pub. No.: WO2010/001019
PCT Pub. Date: Jan. 7, 2010

(65) Prior Publication Data
US 2011/0156890 A1   Jun. 30, 2011

(30) Foreign Application Priority Data

Jun. 6, 2008   (FR) ..................................... 08 53781

(51) Int. Cl.
*B60Q 1/00*   (2006.01)

(52) U.S. Cl.
USPC ........................... 340/435; 340/436; 340/903

(58) Field of Classification Search
USPC ........... 340/903, 435–436; 324/686, 649, 658
See application file for complete search history.

(56) References Cited

U.S. PATENT DOCUMENTS

| | | | |
|---|---|---|---|
| 4,887,066 A * | 12/1989 | Marek | 340/436 |
| 5,394,292 A * | 2/1995 | Hayashida | 361/179 |
| 5,512,836 A * | 4/1996 | Chen et al. | 324/687 |
| 5,651,044 A * | 7/1997 | Klotz et al. | 378/117 |
| 6,051,981 A | 4/2000 | Gershenfeld et al. | |
| 6,275,146 B1 * | 8/2001 | Kithil et al. | 340/425.5 |
| 6,348,862 B1 * | 2/2002 | McDonnell et al. | 340/562 |
| 6,441,623 B1 * | 8/2002 | Moon | 324/661 |
| 6,600,284 B1 | 7/2003 | Weber et al. | |
| 6,650,126 B1 * | 11/2003 | Indihar | 324/658 |
| 6,750,624 B2 * | 6/2004 | Haag et al. | 318/467 |
| 6,879,250 B2 * | 4/2005 | Fayt et al. | 340/436 |
| 2006/0196716 A1 | 9/2006 | Hawes et al. | |

FOREIGN PATENT DOCUMENTS

| | | |
|---|---|---|
| GB | 2404443 | 2/2005 |
| JP | H05139225 A | 6/1993 |

OTHER PUBLICATIONS

International search report dated Oct. 29, 2010 in corresponding PCT/FR2009/051063.

* cited by examiner

*Primary Examiner* — Hai Phan
*Assistant Examiner* — Orlando Bousono
(74) *Attorney, Agent, or Firm* — Young & Thompson

(57) ABSTRACT

This device (4) allows the detection of the presence of an object in a detection zone by measuring a variation in capacitance brought about by the presence of the object. It includes an element (6) for emitting an electric field, an element (8) for receiving an electric field, and elements for measuring the coupling capacitance between the emission element (6) and the reception element (8), the emission element (6) emitting an electrical signal received by the reception element (8) so that a coupling capacitance of a predetermined value is established between the emission element (6) and the reception element (8) when no object is present in the detection zone, a variation in the coupling capacitance indicating the displacement of an object in the detection zone and the establishment of a capacitance of a different value from the predetermined value indicating the presence of a static object.

17 Claims, 1 Drawing Sheet

PROXIMITY DETECTION DEVICE FOR A MOTOR VEHICLE

Figure 1:
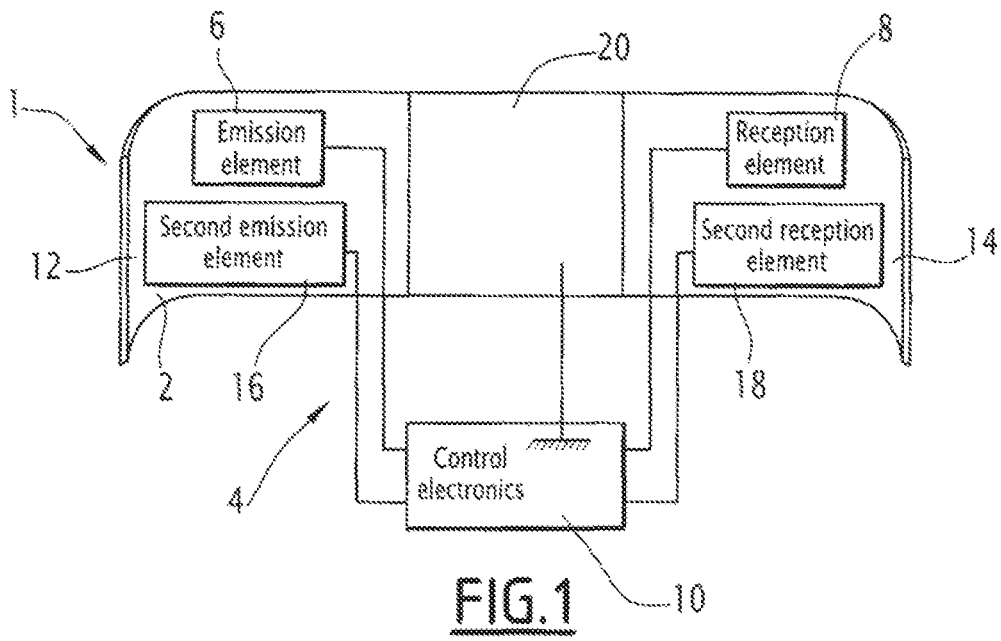

The present invention relates to a device for detecting the presence of an object in a proximity detection zone of a motor vehicle by measuring a variation in capacitance brought about by the presence of said object.

The invention also relates to a bumper comprising such a detection device, as well as a motor vehicle comprising such a bumper.

Such devices are known and for example make it possible to assist the driver in parking his motor vehicle by informing him of the proximity of the obstacles surrounding the vehicle. In general, such a device informs the driver of the presence of obstacles around the vehicle during driving.

Known "capacitive" devices comprise one or several detection plates operating as an oscillating circuit. The capacitance is measured between the detection plate(s) and the ground. The objects that come into the detection zone of the device bring about a variation of the measured capacitance, for example an increase in the capacitance, which makes it possible to determine the presence of the object and evaluate its distance relative to the vehicle as a function of the variation in capacitance between the plate(s) and the ground.

However, such devices only make it possible detect the presence of an obstacle when the vehicle and the obstacle are in motion relative to each other, i.e. when the obstacle moves relative to a stationary vehicle or when the vehicle moves relative to a fixed obstacle or when the vehicle and the object are in motion. If the obstacle and the vehicle are fixed relative to each other, the measured capacitance is constant and the obstacle is not detected.

Moreover, such devices do not make it possible to obtain a very substantial detection zone around the vehicle and only the obstacles close to the vehicle are detected. The driver therefore only obtains information about the presence of an obstacle when the obstacle is near, which can be too late to adapt the driving to the presence of the obstacle.

The invention aims to offset these drawbacks by proposing a detection device making it possible to detect obstacles in motion and obstacles that are fixed relative to the vehicle and offering an enlarged detection zone relative to the existing devices.

To that end, the invention relates to a detection device of the aforementioned type, comprising an element for emitting an electric field, an element for receiving an electric field arranged away from the emission element, and means for measuring the coupling capacitance between the emission element and the reception element, the emission element emitting an electrical signal that is then received by the reception device such that a coupling capacitance of a predetermined value is established between the emission element and the reception element when no object is present in the detection zone, a variation in the coupling capacitance between the emission element and the reception element indicating the displacement of an object in the detection zone and the establishment of a capacitance of a different value from the predetermined value indicating the presence of a static object in the detection zone.

Measuring the capacitance between an emission element and a reception element makes it possible to obtain information on the obstacles in motion and on the obstacles that are fixed relative to the vehicle. Indeed, when an obstacle is in motion and approaches the vehicle, the measured capacitance increases, as for the known devices, and when the obstacle is fixed, the capacitance establishes itself at a different value from that measured when no obstacle is present in the detection zone contrary to the known devices. Thus, a capacitance variation indicates the presence of an obstacle in motion, whereas a capacitance with a different value from the capacitance measured without an obstacle indicates a fixed obstacle. Detecting a fixed obstacle is particularly advantageous, for example when the vehicle is parked and an obstacle could damage the vehicle upon opening of the vehicle's doors. The detection of fixed obstacles is also advantageous before initiating the movement of the vehicle, for forward or backward movement.

Moreover, the detection zone is enlarged because it is easier to supply the emission element at significant alternating voltages, which makes it possible to have a large signal to noise ratio at the reception element and to thereby increase the sensitivity of the device at significant distances. Moreover, the electrical field extending between the emission element and the reception element has a semi-circular shape, which makes it possible to obtain a detection zone more oriented towards an obstacle detection zone of interest.

According to other features of the detection device:
- the detection device comprises a second emission element and a second reception element of an electrical field, said pair of elements being arranged to calibrate the detection device relative to the ground and to perform complementary measurements with the first emission and reception elements;
- the two pairs of emission and reception elements are arranged to operate at different frequencies;
- the emission element emits a modulated signal, the reception element or control electronics comprising a synchronous demodulation device making it possible to demodulate the signal received by the reception element;
- the detection device comprises a signal generator transmitting a square or sinusoidal signal to the emission element and a square signal to the demodulation device of the reception element; and
- the detection device comprises computation means arranged to determine the distance of the object relative to the motor vehicle as a function of the capacitance or the capacitance variation measured over the two pairs of emission and reception elements.

The invention also relates to a motor vehicle bumper comprising a detection device as described above.

According to other features of the bumper:
- the emission element is fastened to an inner transverse end portion of the bumper and the reception element is arranged at the other inner transverse end portion of the bumper;
- the emission element and the reception element are embedded in the material of the bumper; and
- the second emission and reception elements are arranged under the first emission and reception elements of the detection device; and
- the bumper comprises at least one conductive or partially conductive surface arranged on the bumper and inserted between the emission element and the reception element of the detection device, said surface being connected to the ground of said detection device.

The invention also relates to a motor vehicle comprising a bumper as described above.

According to another feature of the vehicle, the motor vehicle comprises a second bumper as defined above, one of the bumpers being fastened to the front of the motor vehicle and the other bumper being fastened to the back of said vehicle.

Figure 2:
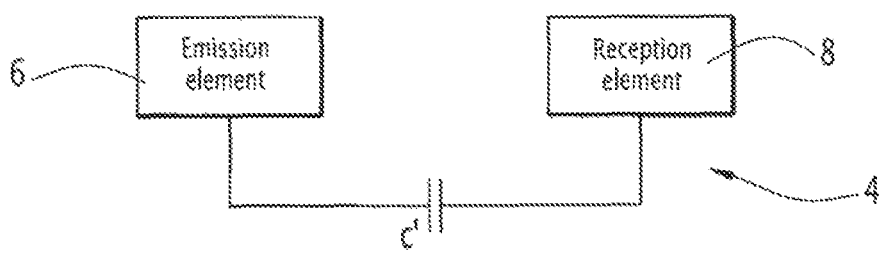
Figure 3:
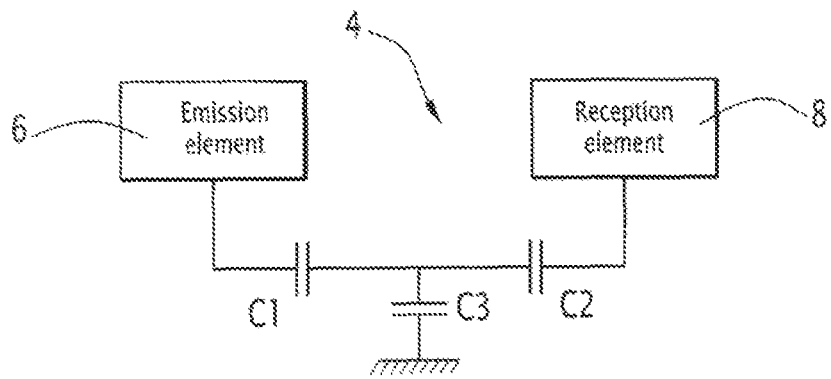

Other aspects and advantages of the invention will appear upon reading the following description, provided as an example and done in reference to the appended drawings, in which:

FIG. 1 is a diagrammatic illustration of a bumper of a motor vehicle comprising a detection device according to the invention, FIG. 2 is a diagrammatic illustration of an equivalent electrical circuit illustrating the operation of the detection device according to the invention when no object is present in the detection zone, FIG. 3 is a diagrammatic illustration of an equivalent electrical circuit illustrating the operation of the detection device according to the invention, when an object is present in the detection zone.

In the description, the terms "transverse," "inner," "outer," "above," "below," etc. are defined relative to the normal directions of an assembled motor vehicle.

In reference to FIG. 1, a bumper 1 is described that is intended to be fastened to the front or back of a motor vehicle (not shown). It will be noted that the invention applies to both the front and the back of the vehicle, the detection device of the invention being particularly advantageous when it is installed at the front and the back of the vehicle in order to provide a larger detection zone. In FIG. 1, the inner face 2 of the bumper 1 is visible. The detection device described here can also be applied on the sides of vehicles, in particular in the side profiles, in order to further increase the detection zone. The side detection is then done through the coupling and combination of the front, back and side devices.

A detection device 4 is illustrated diagrammatically in FIG. 1. This device comprises an emission element 6 of an electrical field, a reception element 8 of an electrical field and control electronics 10, not shown in detail.

The emission element 6 is fastened, for example adhered, to a transverse end portion 12 of the inner face 2 of the bumper 1, in an upper zone thereof. The reception element 8 is fastened, for example adhered, to the other transverse end portion 14 of the inner face 2 of the bumper, in an upper zone thereof. These elements 6 and 8 comprise a conductive material over at least one of their faces or over both of their faces. The elements 6 and 8 can also be conductive surfaces applied on the inner or outer surface of the bumper or another element of the motor vehicle. The elements 6 and 8 can also be embedded in the material of the part to which they are secured. According to one embodiment, the elements 6 and 8 are each made up of a plurality of emission and reception elements.

The emission element 6 is connected to the control electronics 10 so as to emit an electrical field that will then be received by the reception element 8. The emission element 6 is arranged to emit square or sinusoidal modulated electrical signals. To that end, the control electronics 10 comprise a signal generator (not shown) transmitting a square or sinusoidal signal to the emission element 6. The emitted signal for example has a voltage with a peak-to-peak amplitude substantially equal to 20 V. The larger the area of the conductive material of the emission element 6, the more the alternating voltage of the emitted signal can be reduced to obtain an equivalent result. The signal emitted by the emission element 6 for example operates at a frequency between 50 KHz and 200 KHz. It will be understood that other frequencies can be used by adapting the control electronics 10. The modulation of the emitted signal makes it possible to distinguish it from other surrounding signals, for example coming from detection devices of other vehicles or others, so that the reception element 8 processes the signal emitted by the emission element 6 and not another one. The processing of parasitic signals is thus avoided.

The reception element 8 is arranged to receive the electrical signal emitted by the emission element 6 and to demodulate it synchronously or to transmit the received signal to the control electronics taking care of the synchronous demodulation in order to extract the signal from the ambient noise. To that end, in order to perform the synchronous demodulation, the reception element 8 or the control electronics 10 comprises a synchronous demodulation device (not shown), known in itself, which receives a square signal from the signal generator of the control electronics 10. The signal transmitted to the demodulation device has the same frequency as the signal transmitted to the emission element, i.e. between 50 KHz and 200 KHz according to the aforementioned example. In a known manner, the reception element 8 is for example done by using an inverting amplifier connected to a tuned circuit. The output is connected to the demodulation device, itself connected to a low-pass filter. The tuned circuit makes it possible to limit the bandwidth of the reception element at the frequency of interest of the received signal. The large noise components that could disrupt the measurement are thus eliminated. The demodulation device and the low-pass filter act as a narrow-band filter. The synchronous demodulation makes it possible to obtain a very significant signal to noise ratio, which makes it possible to receive the emitted signal even when it is very weak. The detection distance can thus be increased, as will be described later.

The control electronics 10 comprise means for measuring the coupling capacitance between the emission element 6 and the reception element 8 from the signal emitted by the emission element 6 and the signal demodulated by the synchronous demodulation device.

In reference to FIGS. 2 and 3, the operation of the device described above is as follows:

when there is no obstacle in the detection zone, i.e. the emission zone of the electrical field by the emission element, the emission element 6 and the reception element 8 are equivalent to two capacitances in series, $C_1$ and $C_2$ respectively. The coupling capacitance C', as illustrated in FIG. 2, between the emission element 6 and the reception element 8 then has a predefined fixed value measured by the measuring means.

when an obstacle penetrates the detection zone, it is equivalent to a capacitance $C_3$ connected on one hand to the ground and connected on the other hand between the capacitance $C_1$ of the emission element 6 and the capacitance $C_2$ of the reception element 8, as shown in FIG. 3. The closer the obstacle is to the bumper 1, the more $C_3$ increases, which causes a variation of the measured coupling capacitance and makes it possible to determine the presence of an obstacle in the detection zone.

When the obstacle is in motion relative to the motor vehicle, the measured coupling capacitance varies. When the obstacle is fixed relative to the vehicle, the coupling capacitance is equal to a different value from the predefined fixed value measured when no obstacle is in the detection zone. Thus the device makes it possible to determine the presence of an obstacle that is fixed or in motion in the detection zone.

Due to the use of an emission element and a reception element, it is possible to supply the emission element at significant voltages, which improves the quality of the emitted signal. Moreover, the use of the synchronous demodulation makes it possible to optimally isolate the received signal from the noise. These factors make it possible to obtain a large detection zone extending in front of or behind the bumper depending on whether it is a front bumper or a rear bumper. A detection zone extending on the sides of the front or rear bumper 1 and on the lateral sides of the motor vehicle is also advantageously obtained. The detection zone is substantially half-circle shaped. For example, the detection of an obstacle is performed up to 1.5 m around the bumper. According to another example, the detection is performed, depending on the adjustments, up to a distance of 4 m or more.

According to one embodiment, the emission 6 and reception 8 elements can operate alternatively using an electronic rocking device. These elements can also operate as purely capacitive elements.

If the emission element 6 and the reception element 8 described above are used alone, it is possible for the level variations of the ground relative to the bumper to be considered as obstacles falling within the detection zone. To offset this drawback, the detection device 4 comprises a second pair of emission 16 and reception 18 elements.

This second pair of elements 16 and 18 also makes it possible to calculate the distance of an object in the detection zone and its position. To that end, the control electronics 10 comprise computation means arranged to determine the distance of the obstacle relative to the bumper 1 as a function of the signals emitted by the emission elements 6 and 16 and received by the reception elements 8 and 18.

The second pair of elements has the same structure and operates according to the same principle as the emission element 6 and the reception element 8 described above. In order to allow both pairs to operate at the same time, the signal generator of the control electronics transmits signals at a different frequency to the second pair. This frequency is also for example between 50 KHz and 200 KHz. According to one particular embodiment, if the emission element 6 and the reception element 8 operate at a frequency of 80 KHz, the emission element 16 and the reception element 18 operate at a frequency of 170 KHz. Thus, each pair operates independently of the other and the signals are not mixed. The second emission 16 and reception 18 elements are each arranged at an end portion 12, 14 of the bumper under the emission 6 and reception 8 elements. This second pair makes it possible to calibrate the first pair by performing measurements of the ground level variations such that the driver is not informed of those variations when determining the presence of an obstacle in the detection zone.

When the bumper is painted, a conductive "primer," or "primary" or "finish," layer is deposited on the bumper in order to ensure better adhesion of the paint or a particular orientation of the color particles. The presence of this layer can have the result that the emission element 6 transmits a signal to the reception element 8 directly through the primer layer almost without sending a signal towards the outside of the vehicle, which can deteriorate the detection performance of the detection device 4. To offset this drawback, a conductive or partially conductive surface 20 is arranged on the inner face of the bumper 1 between the emission element 6 and the reception element 8. This surface 20 is connected to the ground of the control electronics. The surface 20 for example extends over the entire height of the bumper and is also inserted between the two emission 16 and reception 18 elements. The inventors have noted that this surface 20 makes it possible to eliminate the effects of the primer layer by preventing a direct transmission of the signal through that layer. The surface 20 is for example made by a conductive ink or paint deposited on the inner face of the bumper 1. An aluminum foil can also be considered.

The detection device 4 described above comprises a device for providing information to the vehicle's driver, informing him of the presence of an obstacle in motion or stationary around the motor vehicle. This device can also provide information on the distance of this obstacle relative to the vehicle. This device informs the driver as a function of the signal emitted by the detection device, this signal indicating whether a variation of the coupling capacitance or an establishment of a capacitance of a different value occurs.

It will be understood that the emission and reception elements can also be arranged on the outer face of the bumper or integrated inside the material of the bumper as previously described.

According to other embodiments, the emission and reception elements can be placed on other parts of the vehicle, such as the shock absorbers, the side profiles, the beams, the skirts, etc.

The detection device described above is particularly advantageous because it makes it possible to have a large detection zone around the motor vehicle, particularly if two devices are used, i.e. one in front of the vehicle and one in the rear. Moreover, it makes it possible to detect both obstacles in motion and fixed obstacles.

The invention claimed is:

1. A detection device (4) for detecting the presence of an object in a proximity detection zone of a motor vehicle by measuring a variation in coupling capacitance brought about by the presence of said object, comprising:
    a first emission element (6), the first emission element (6) emitting an modulated electric signal;
    a first reception element (8) arranged away from the first emission element (6), the first reception element (8) receiving the modulated electric signal from the first emission element (6);
    a detection zone proximate the first emission element (6) and the first reception element (8);
    a synchronous demodulation device that amplitude demodulates the modulated electric signal received by the first reception element (8); and
    a control electronics (10) comprising a coupling capacitance measuring element operatively connected to measure coupling capacitance between the first emission element (6) and the first reception element (8), wherein,
    the first emission element (6) and the first reception element (8) are positioned so that the modulated electric signal emitted by the first emission element (6) is received by the first reception element (8) and amplitude-demodulated by the synchronous demodulation device such that a coupling capacitance of a predetermined value is established between the first emission element (6) and the first reception element (8) when no object is present in the detection zone,
    a variation in the coupling capacitance between the first emission element (6) and the first reception element (8), measured by the measuring element, indicates displacement of an object in the detection zone, and
    establishment of a coupling capacitance between the first emission element (6) and the first reception element (8) of a different value from the predetermined value, measured by the measuring element, indicates a presence of a static object in the detection zone;
    an information device operatively connected to the measuring element, the information device configured to i) inform a vehicle's driver of the presence of a moving obstacle around the motor vehicle based on a signal from the measuring element, and ii) inform the driver of the presence of a stationary obstacle around the motor vehicle based on another signal from the measuring element;

a second emission element (16) and a second reception element (18), said second emission element and said second reception element being arranged to perform measurements of ground level variations with respect to the motor vehicle in order to calibrate the detection device (4) relative to the ground and to perform complementary coupling capacitance measurements with the first emission element (6) and the first reception (8) element; wherein the first and second emission elements (6, 16) and the first and second reception elements (8, 18) are arranged to operate at the same time and at different frequencies, the first emission and reception elements operating at a first frequency and independent of the second emission and reception elements operating at a second frequency, signals from the first emission and reception elements not being mixed with signals from the second emission and reception elements; wherein the first emission element (6) emits one of the group consisting of a square modulated electric signal and a sinusoidal modulated electrical signals at the first frequency, the first reception element (8) is tuned to the first frequency to limit a bandwidth of the first reception element (8) to the first frequency, and the first reception element (8) transmits the received modulated electric signal, at the first frequency, to the demodulation device such that the modulated electric signal transmitted to the demodulation device has the same frequency as the modulated electric signal transmitted to the emission element.

2. The detection device according to claim 1, wherein, one of the group consisting of the first reception element (8) and the control electronics (10) comprises the synchronous demodulation device.

3. The detection device according to claim 1, further comprising a computation element arranged to determine a distance of the object relative to the motor vehicle as a function of the established coupling capacitance or the variation of the coupling capacitance measured over the first and second emission elements (6, 16) and the first and second reception elements (8, 18).

4. A motor vehicle bumper (1) comprising:

the detection device (4) for detecting the presence of an object in a proximity detection zone of a motor vehicle of claim 1, the detection device (4) mounted on the motor vehicle bumper (1).

5. The motor vehicle bumper according to claim 4, wherein, the first emission element (6) is fastened to a first inner transverse end portion (12) of the motor vehicle bumper and the first reception element is arranged at an opposite, second inner transverse end portion (14) of the motor vehicle bumper.

6. The motor vehicle bumper according to claim 4, wherein the first emission element (6) and the first reception element (8) are embedded in the material of the motor vehicle bumper.

7. The motor vehicle bumper according to claim 4, wherein the second emission and reception elements (16, 18) are arranged under the first emission and reception elements (6, 8).

8. The motor vehicle bumper according to claim 4, further comprising at least one conductive or partially conductive surface (20) arranged on the motor vehicle bumper (1) and inserted between the first emission element (6) and the first reception element (8), said at least one conductive or partially conductive surface (20) being connected to the ground of said detection device (4).

9. A motor vehicle comprising at least one motor vehicle bumper (1) according to claim 4.

10. The motor vehicle according to claim 9, further comprising a second motor vehicle bumper (1) according to claim 4, one of the motor vehicle bumpers (1) being fastened to the front of the motor vehicle and the other motor vehicle bumper being fastened to the back of said motor vehicle.

11. A motor vehicle bumper (1) comprising the detection device (4) according to claim 1, the detection device (4) mounted on the motor vehicle bumper.

12. The motor vehicle bumper according to claim 11, wherein, the first emission element (6) is fastened to a first inner transverse end portion (12) of the motor vehicle bumper and the first reception element is arranged at an opposite, second inner transverse end portion (14) of the motor vehicle bumper.

13. The motor vehicle bumper according to claim 11, wherein the first emission element (6) and the first reception element (8) are embedded in the material of the motor vehicle bumper.

14. The motor vehicle bumper according to claim 11, further comprising at least one conductive or partially conductive surface (20) arranged on the motor vehicle bumper (1) and inserted between the first emission element (6) and the first reception element (8), said at least one conductive or partially conductive surface (20) being connected to the ground of said detection device (4).

15. A motor vehicle comprising at least one motor vehicle bumper (1) according to claim 11.

16. The motor vehicle according to claim 15, comprising two of said motor vehicle bumpers (1), a first of the motor vehicle bumpers (1) being fastened to the front of the motor vehicle and a second of the motor vehicle bumpers (1) being fastened to the back of said vehicle.

17. The detection device according to claim 1, wherein the detection zone is at least 1.5 m around a motor vehicle bumper and up to a distance of 4 m around the motor vehicle bumper.

* * * * *